Figure 1:
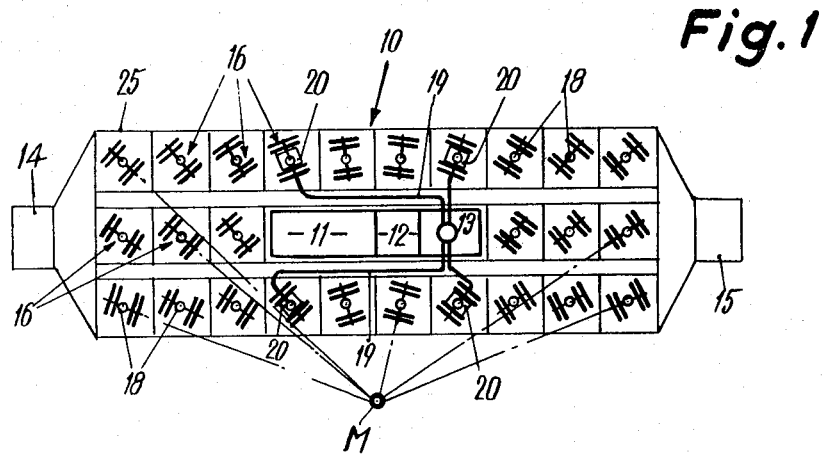

United States Patent
Scheuerle

[15] 3,693,741
[45] Sept. 26, 1972

[54] DRIVING DEVICE FOR HEAVY MOTOR-TRUCKS

[72] Inventor: Willy Scheuerle, D-7114 Pfedelbach-Ohringen, Germany

[22] Filed: March 3, 1970

[21] Appl. No.: 15,986

[30] Foreign Application Priority Data

March 4, 1969 Germany..........P 19 10 809.9

[52] U.S. Cl. ........................180/23, 180/42, 180/50, 180/56, 180/66 R
[51] Int. Cl. ...............................................B60k 7/00
[58] Field of Search ...180/42, 52, 49, 50, 6.48, 44 F, 180/43, 55, 56, 59, 60, 62, 66 F, 23

[56] References Cited

UNITED STATES PATENTS

| | | | |
|---|---|---|---|
| 948,317 | 2/1910 | Fuller | 180/52 |
| 1,079,607 | 11/1913 | Schieler | 180/42 |
| 1,619,616 | 3/1927 | Ionides | 180/42 |
| 2,753,946 | 7/1956 | Quayle | 180/52 X |
| 3,161,245 | 12/1964 | Thoma | 180/6.48 |
| 3,280,931 | 10/1966 | Cahill et al. | 180/42 X |
| 3,344,879 | 10/1967 | Glomb et al. | 180/43 |
| 3,351,147 | 11/1967 | Williamson | 180/44 F |

FOREIGN PATENTS OR APPLICATIONS 158,962   2/1921   Great Britain...............180/52

*Primary Examiner*—A. Harry Levy
*Attorney*—Michael S. Striker

[57] ABSTRACT

A driving device for heavy motor trucks in which each axle assembly supports at least one wheel on each side and comprises an axle housing block containing two hydraulic motor units located along the longitudinal axis of the vehicle on either side of the wheel center plane, preferably in the form of adjustable stroke motor units for driving the wheels.

12 Claims, 5 Drawing Figures

INVENTOR.
WILLY SCHEUERLE

DRIVING DEVICE FOR HEAVY MOTOR-TRUCKS

This invention relates to a driving device for heavy motor trucks with opposed wheels mounted on a common axle or in particular on an oscillating swing axle mounted at right angles to the vehicle centerline and each driven by a hydraulic motor on the inner face of the wheel concerned. A driving mechanism of this nature enables constructional expense to be kept relatively low while obtaining a favorable drive layout to the wheels, since for the transmission of driving torque to the individual axles only oil pipes are required which can be laid in any convenient position, and since the hydraulic motors can be located in a favorable position close to the wheels. In addition, the drive can be distributed very evenly among all the driven axles.

Another object of the invention is an arrangement by means of which only a small space is required between the wheels to house a driving unit capable of producing large amounts of power and achieving high speeds.

Another object of the invention is an arrangement of the two hydraulic motors provided for a single axle such that these can both be accommodated in a relatively narrow space between the wheels.

Another object of the invention consists in the fact that it makes possible employment of a minimum number of components for drive and axle suspension and also provides a strong and rigid unit also capable of withstanding heavy axle loads, while at the same time saving space and weight.

In view of the above an important characteristic of the invention consists in the fact that two hydraulic motors on either side of the axle center plane are mounted one behind the other driving the opposed wheels on a single axle, and are combined into a common axle housing block between the wheels, this block also serving as an axle mounting or support element for the wheels when attached to the superstructure of the vehicle.

As a result of the previously known construction of the hydraulic motors as adjustable stroke motors the rotating speed of the wheels and the travel speed can be considerably increased without increasing the flow volume of the pump delivering the drive fluid, and without the necessity of installing a mechanical variable ratio intermediate gearbox. On the other hand the vehicle can move at a crawling speed while the motors generate high torque. Since any number of separate axles can be driven, extremely high driving forces of up to many thousands of horsepower can be transmitted.

In accordance with a further preferred characteristic of the invention either the two adjustable stroke motors on a single axle or all the adjustable stroke motors installed on a particular vehicle can be adjusted together.

The axle drive gear housing serves wholly or partly as an axle element or wheel carrier and can be attached to the vehicle superstructure through a suspension device and/or a hydraulic equalizing mechanism and/or pivoted about a vertical steering axis for the purposes of directing the vehicle.

As adjustable stroke, axial piston motors or swashplate motors may be used, with cylinders capable of being swivelled in relation to the drive plate or swashplate, this drive or swash plate then transmitting the drive further to the wheels. In place of two opposed wheels on each individual axle it is also quite possible to employ two opposed sets of twin wheels or similar wheel groups on each individual axle.

Figure 4:
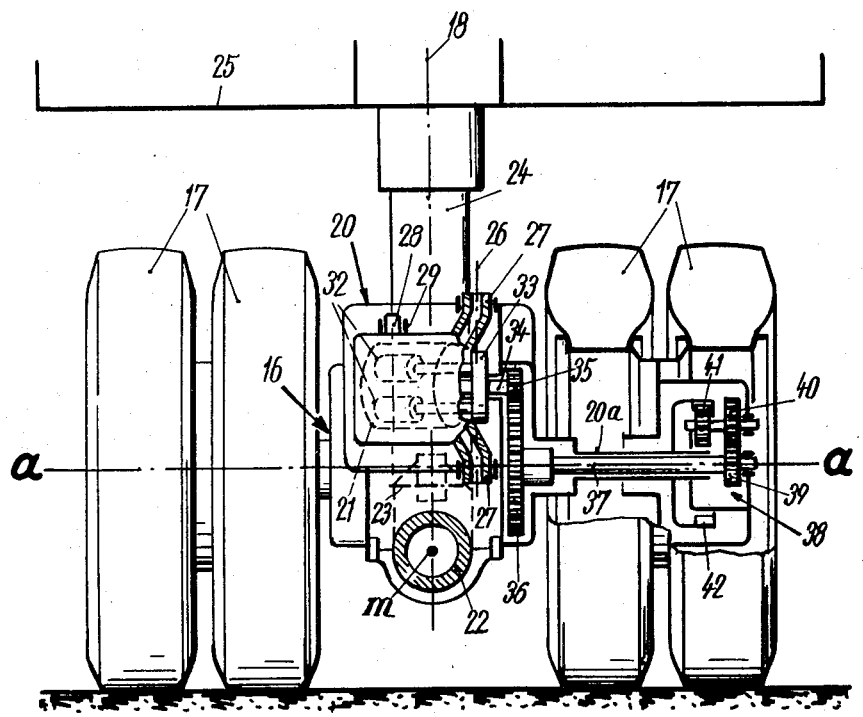
Figure 2:
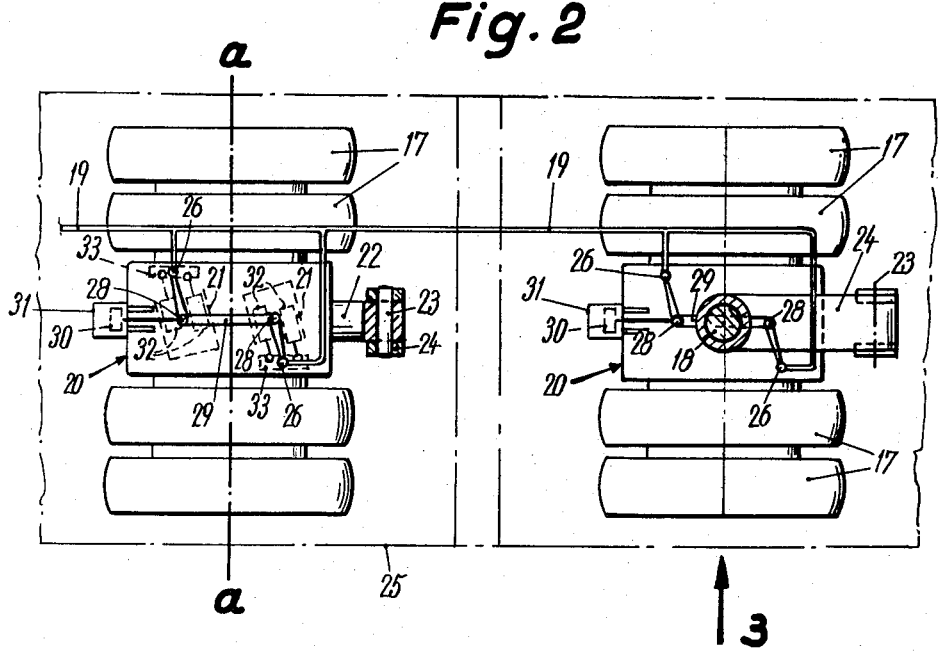
Figure 3:
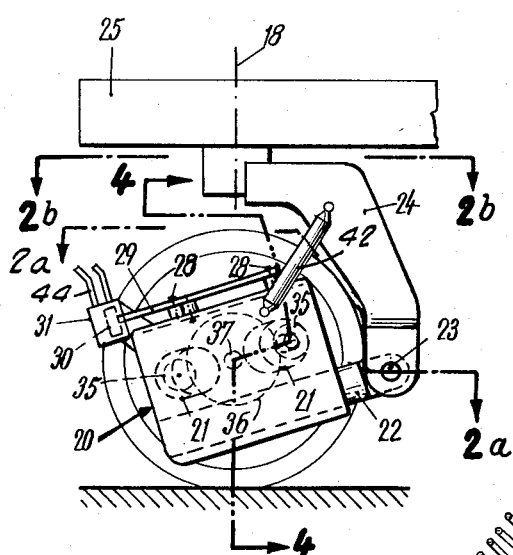
Figure 5:
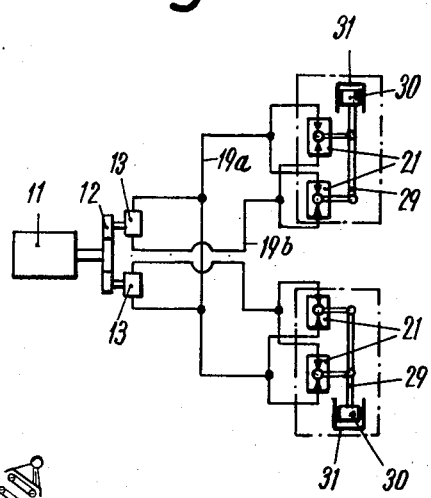

The drawing shows a sample application of the invention. It indicates:

FIG. 1 A schematic plan view from above of a heavy load truck with a number of steerable individual axles arranged in three adjacent rows;

FIG. 2 A partial top view of two individual axles one behind the other, with the left axle shown in the section 2a — 2a and the right axle shown in the section 2b — 2B indicated in FIG. 3;

FIG. 3 A side view of an individual axle at the point indicated by an arrow on FIG. 2;

FIG. 3a A side view of a modified detail of FIG. 3;

FIG. 4 A section through one of the individual axles at approximately the line indicated by 4 — 4 on FIG. 3, to an enlarged scale;

FIG. 5 A circuit diagram for the hydraulic drive to two individual axles, e.g. located on opposite sides of the vehicle.

The heavy load truck 10, which is equipped as a self-propelling vehicle, possesses a motive power unit 11, e.g. a diesel or other form of internal combustion engine, a clutch and/or an intermediate gearbox 12 and an adjustable drive pump 13 which may take the form of an axial piston pump. In place of one motive power unit, clutch, intermediate gearbox and pump etc. two thereof or more may be provided to operate on various wheels of the vehicle separately or else in common, in a partial or complete parallel or series circuit on the same wheels of the vehicle. 14 and 15 are front and rear driving cabs so designed that the vehicle can travel in either direction. Each cab is equipped with controls for the motive power unit(s) 11 and the adjustable pump(s). When the drive load increases, for example on a steep mountain, pumps 13 are set to a lower stroke volume at a higher pressure, as is known to those skilled in the art.

As can be seen from FIG. 1, the heavy load truck is intended to support considerable weights, and possesses a large number of individual axle assemblies, more particularly the swing axle 16, and housings 20 which in the example illustrated are arranged in three adjacent rows and entirely surround in plan view the driving equipment comprising motive power unit 11, intermediate gearbox 12 and hydraulic pump 13. By means of a steering linkage of conventional design operated from the driving cab 14 or 15, and of either mechanical or hydraulic type, the individual axle assemblies 20, 16 are pivoted about vertical shafts 18 positioned between the wheels 17 which are mounted in an axially aligned position on the axle ends. The steering geometry can for preference be so designed that the axes of all swing axles 16 intersect at a common steering center point M when the vehicle is moved in a curve. Despite the length and size of the vehicle this enables relatively tight curves to be negotiated.

In the sample execution shown in FIG. 1 a total of four of the large number of individual axle assemblies on the vehicle is driven by fluid directed to them by way of lines 19 from the drive pump 13.

It is evident that the number and layout of the individual axle assemblies, the number of driven individual axles, the design of the steering, the layout of the driving equipment or similar features can be varied as desired within the context of the invention.

As FIG. 2 indicates, lines 19 lead to axle gearbox housing blocks, generally identified as 20 and forming a major element on each of the individual axles 16. These housing blocks are located between the wheels 17 and house the adjustable stroke motors 21. On the lateral axle tubes 20a, see FIG. 4, of the housing blocks 20 are mounted twin wheels 17 on either side in an axially aligned position.

Each of the axle gearbox housing blocks 20 is for preference capable of being swivelled about a longitudinal vehicle axis m, and is mounted on a tubular carrier 22 which is pivotally mounted on a support arm 24 by a lateral pivot 23 displaced to front or rear of the axle gearbox housing block, as shown in FIG. 3. The support arm 24 is in turn pivoted about vertical pivot shaft 18, which at the same time forms the steering axis of the individual axle assembly 16, 20 and by means of shaft 18 mounted on to the vehicle frame or superstructure 25 in such a way as to provide swivelling movement. For spring suspension of the individual axles a familiar form of leaf spring, coil spring, hydropneumatic spring or other springing means can be provided to support the individual axle assemblies on the frame or vehicle superstructure 25 or on the support arm 24. FIG. 3 shows a hydraulic piston and cylinder means 42 connecting support arm 24 with block 20, for which a coil spring 43, shown in FIG. 3a may be substituted. The individual axle assemblies can remain unsprung in their connection with the vehicle superstructure 25 and can be supported against this or the support arm 24 by means of hydraulic equalizing cylinders 42 intended to equalize the static level of the vehicle in relation to the individual axles or similar devices.

The hydraulic motors 21, 32, 33 take the form of adjustable stroke motors and include cylinder blocks 21 mounted for this purpose turnably about vertical shafts 26 as best seen in FIGS. 2 and 4. To provide for this they are located by journals 27 in bearings on the axle housing block 20 and provided with adjusting journals 28. The two adjusting journals 28 of the adjusting motors 21, 32, 33 of an individual axle assembly are located one behind the other aligned in the direction of travel of the vehicle, and linked together by an adjusting link 29. In the cylinder 31 of an adjusting motor in the axle housing block is an adjusting piston 30 which is connected by suitable means to adjusting link 29. This piston can for example from the driver's position be operated hydraulically, and determines the angle taken up by the adjustable stroke driving motors 21. Conduits 44 connected with cylinders 31 for supplying a fluid medium are shown in FIG. 3. In the cylinder block 21 of each of the adjustable stroke motors 21, 32, 33 are to be found two or more axial cylinders, distributed around the axis of the cylinder block 21 of the motor. These cylinders contain reciprocating pistons 32. The adjustable stroke motors 21, 32, 33 can for example be designed as axial piston machines, the pistons 32 of which actuate in familiar fashion rotary but non-adjustable drive swashplates 33 in axle housing block 20 in such a manner that swivel movement of the adjustable cylinder block 21 around shaft 26 causes the pistons, depending on the angle of the cylinder block 21, to traverse a varying stroke, with the effect that depending on the amount of driving fluid delivered, the speed of driving plate 33 increases or decreases.

The adjustable stroke motors 21, 32, 33 are displaced in relation to centerline $a - a$ of the wheels, and are in fact located one behind the other but on opposite sides of the centerline $a - a$ with journals aligned. They can also be displaced relatively in terms of height (In FIG. 4 the cylinder block 21 is shown located at approximately the plane of each drawing containing centerline $a - a$).

The driving swashplate 33 of the individual adjustable stroke motor 21, 32, 33 acts on a shaft 34 and turns a gear pinion 35, which in turn drives a large gearwheel 36, which in the example illustrated in FIG. 4 is located on the same axis as the centerline $a - a$ of wheels 17 on shaft 37. By means of shaft 37, wheel assembly 17 consisting of twin road wheels is driven by a further reduction gearbox 38 in the form of a planetary gearset comprising sunwheel 39 and planet wheels 40, 41, the latter of which runs on gear ring 42 which is rigidly attached to axle housing block 20.

In a similar manner as the right wheel assembly illustrated in FIG. 4 the left wheel assembly is also driven, but by the second of the two adjustable stroke motors 21, 32, 33 which are housed in a common axle housing block 20.

FIG. 5 shows an example of a hydraulic drive system for two vehicle axles, for instance when located on opposite sides. In this system two pumps of the axial piston swashplate type 13 are driven by the motive power unit 11 by way of the intermediate gearbox 12. Both pumps 13 supply a common pipe system 19a, which delivers fluid in each case to one side of adjustable cylinder block 21, the supply to the adjustable stroke motors being so arranged that all wheels turn in the same dirction. A return line system 19b leads back to the pumps 13. If the vehicle is driven in the opposite direction—for example by suitable adjustment of the pump 13—the return line system 19b can act as a supply system, and supply system 19a as return system. The driving fluid is in such case conveyed through fluid lines 19, 19a, 19b to the cylinder blocks 21 of the adjustable stroke motors 21, 32, 33 preferably through hollow axle journals 27 or expelled through these from the adjustable stroke motors.

By hydraulic movement of adjusting pistons 30 in the adjusting cylinder 31, actuated from the driving cab, the adjustable cylinder blocks 21 are angularly displaced by means of adjusting links 29 which are connected with the cylinder blocks 21 by journals 28, and connected with the swash plate 33 and housing block 20 by journals 26, 27. The motors for all individual driven axle assemblies can be adjusted to the same degree or, if desired, or required, to differing degrees when adjusting arms 29 are operated by pistons 30 in cylinders 31 receiving different amounts of a fluid miedum, as may also take place when the vehicle moves in a curve, as shown in FIG. 1. The vehicle is normally set in motion with the adjustable stroke motors swivelled out to a very large angle and operating at a restricted flow rate, whereas operation at maximum rotating speed entails a high flow rate and a small swing-out angle of the adjustable stroke motors. By opposed adjustment of the adjusting pump and the adjustable stroke motor the hydraulic system can in addition be used for braking.

Although my invention has been illustrated and described with reference to a preferred embodiment thereof, I wish to have it understood that it is in no way limited to the details of such an embodiment but is capable of numerous modifications substantially within the scope of the appended claims.

Having thus fully disclosed my invention, what I claim is:

1. A driving device for a truck having an elongated supporting structure, comprising a plurality of axle assemblies, each axle assembly including two wheel axles aligned along the horizontal wheel axis, a housing between said wheel axles rigidly connected with the same, and two wheel means mounted for rotation on said wheel axles, respectively; supporting means for suspending said axle assemblies from said supporting structure for pivotal steering movement about a vertical axis; two hydraulic motors for driving said wheel means, respectively, each hydraulic motor including adjusting means for varying the drive torque of said hydraulic motors, said hydraulic motors being mounted in said housing between said wheel means substantially aligned in longitudinal direction of said supporting structure equidistant from said wheel means; and drive control means connected with said adjusting means for adjusting the drive torque transmitted from said two hydraulic motors to said two wheel means, respectively.

2. A driving device according to claim 1 wherein said axles are hollow, and comprising transmission means in said hollow axles connecting said hydraulic motors, respectively, with said wheel means, respectively.

3. A driving device as claimed in claim 1 wherein said hydraulic motors have pistons whose stroke is adjustable by said adjusting means.

4. A driving device as claimed in claim 1 wherein said drive control means include linkage means connecting said adjusting means for said hydraulic motors for simultaneously adjusting the same.

5. A driving device as claimed in claim 4 wherein said linkage means include a link extending in the longitudinal direction of said supporting structure and connected to said adjusting means for said hydraulic motors.

6. A driving device as claimed in claim 1 wherein said truck includes at least one driver's cab; and wherein said drive control means include manually operated means in said driver's cab.

7. A driving device as claimed in claim 1 wherein each of said hydraulic motors include a vertical support journal mounted on said housing for turning movement about a vertical axis, and an adjusting journal, said drive control means including a link connecting said adjusting journals.

8. A driving device as claimed in claim 7 wherein said support journals are hollow for the supply of a fluid medium to said hydraulic motors.

9. A driving device as claimed in claim 1 wherein said supporting means include a supporting arm mounted on said supporting structure for turning movement about said vertical axis, a carrier for said housing, and pivot means on said supporting arm supporting said carrier for pivotal movement with said axle assembly about an axis transverse to said vertical axis.

10. A driving device as claimed in claim 1 wherein said drive control means includes hydraulic piston and cylinder means.

11. A driving device according to claim 1 wherein each of said hydraulic motors includes a cylinder block part mounted on said housing for angular movement by said adjusting means about a vertical axis, and swash plate means rotatably mounted on said housing and connected with said wheel means for driving the same.

12. A driving device for a truck having an elongated supporting structure, comprising a plurality of axle assemblies, at least some of which are longitudinally displaced, each axle assembly including two wheel axles aligned along a horizontal wheel axis, a member between said two wheel axles rigidly connected with the same, and two wheel means mounted for rotation on the ends of said wheel axles, respectively, said member being located within the space defined by the circumferences of said wheels; supporting means for suspending each said member from said supporting structure; two hydraulic motors including adjusting means for varying the drive torque of said hydraulic motors, said hydraulic motors being mounted within each said member between said wheel means and displaced in longitudinal direction of said supporting structure; and hydraulic drive control means connected with said adjusting means for adjusting the drive torque transmitted from said hydraulic motors to said wheel means.

* * * * *